US012008930B2

(12) United States Patent
Zhang

(10) Patent No.: US 12,008,930 B2
(45) Date of Patent: Jun. 11, 2024

(54) DISPLAY PANEL AND MANUFACTURING METHOD THEREOF

(71) Applicants: WUHAN CHINA STAR OPTOELECTRONICS TECHNOLOGY CO., LTD., Wuhan (CN); WUHAN CHINA STAR OPTOELECTRONICS SEMICONDUCTOR DISPLAY TECHNOLOGY CO., LTD., Wuhan (CN)

(72) Inventor: Yang Zhang, Wuhan (CN)

(73) Assignees: WUHAN CHINA STAR OPTOELECTRONICS TECHNOLOGY CO., LTD., Wuhan (CN); WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/434,723

(22) PCT Filed: Jun. 8, 2021

(86) PCT No.: PCT/CN2021/098963

§ 371 (c)(1),
(2) Date: Aug. 27, 2021

(87) PCT Pub. No.: WO2022/236904

PCT Pub. Date: Nov. 17, 2022

(65) Prior Publication Data

US 2024/0021112 A1 Jan. 18, 2024

(30) Foreign Application Priority Data

May 8, 2021 (CN) ........................ 202110500590.4

(51) Int. Cl.
*G06F 1/16* (2006.01)
*G09F 9/30* (2006.01)

(52) U.S. Cl.
CPC .................................... *G09F 9/301* (2013.01)

(58) Field of Classification Search
CPC ....... G06F 1/1641; G06F 1/1652; G09F 9/301
See application file for complete search history.

(56) References Cited

U.S. PATENT DOCUMENTS 11,568,767 B2 * 1/2023 Feng ..................... G06F 1/1641
2006/0234035 A1 10/2006 Wang et al.

(Continued)

FOREIGN PATENT DOCUMENTS

CN 102412122 A 4/2012
CN 104742482 A 7/2015

(Continued)

OTHER PUBLICATIONS

International Search Report in International application No. PCT/CN2021/098963, dated Jan. 25, 2022.

(Continued)

*Primary Examiner* — Anthony Q Edwards
(74) *Attorney, Agent, or Firm* — PV IP PC; Wei Te Chung; Zhigang Ma

(57) ABSTRACT

The present invention provides a display panel and a manufacturing method of the display panel. The display panel includes a first film layer, a second film layer, and a bonding layer which are arranged in a first folding region. When the display panel is in a bent state, first tangential forces of the first film layer exerted on a first surface of the bonding layer and second tangential forces of the second film layer exerted on the second surface of the bonding layer point to a center of the first folding region. The bonding layer is bent in advance, and the bonding layer is bonded with the first film (Continued)

layer in the bent state and bonded with the second film layer in a flat state, so bending stresses of the bonding layer are relieved.

20 Claims, 5 Drawing Sheets

(56) References Cited

U.S. PATENT DOCUMENTS

| | | | | |
|---|---|---|---|---|
| 2010/0230430 | A1 | 9/2010 | Beuther | |
| 2012/0312470 | A1 | 12/2012 | Chen | |
| 2014/0355195 | A1* | 12/2014 | Kee | G06F 1/1616 361/679.27 |
| 2016/0146979 | A1 | 5/2016 | Lim | |
| 2017/0199547 | A1* | 7/2017 | Jeong | B32B 37/12 |
| 2019/0019966 | A1 | 1/2019 | Jiang et al. | |
| 2021/0086469 | A1* | 3/2021 | Cosgrove | G06F 1/1652 |

FOREIGN PATENT DOCUMENTS

| | | | |
|---|---|---|---|
| CN | 106346844 | A | 1/2017 |
| CN | 106530973 | A | 3/2017 |
| CN | 106652802 | A | 5/2017 |
| CN | 107425142 | A | 12/2017 |
| CN | 108496109 | A | 9/2018 |
| CN | 108710454 | A | 10/2018 |
| CN | 108773142 | A | 11/2018 |
| CN | 209149719 | U | 7/2019 |
| CN | 110148358 | A | 8/2019 |
| CN | 110189638 | A | 8/2019 |
| CN | 110992838 | A | 4/2020 |
| CN | 111105715 | A | 5/2020 |
| IN | 107908308 | A | 4/2018 |
| JP | 2019096393 | A | 6/2019 |
| WO | 2015146367 | A1 | 10/2015 |
| WO | 2018054118 | A1 | 3/2018 |
| WO | 2021066191 | A1 | 4/2021 |

OTHER PUBLICATIONS

Written Opinion of the International Searching Authority in International application No. PCT/CN2021/098963, dated Jan. 25, 2022.
Chinese Office Action in corresponding Chinese Patent Application No. 202110500590.4 dated Dec. 21, 2021, pp. 1-10.
Notification to Grant Patent Right for Invention issued in corresponding Chinese Patent Application No. 202110500590.4 dated Mar. 16, 2022, pp. 1-7.

* cited by examiner

DISPLAY PANEL AND MANUFACTURING METHOD THEREOF

RELATED APPLICATIONS

This application is a Notional Phase of PCT Patent Application No. PCT/CN2021/098963 having international filing date of Jun. 8, 2021, which claims the benefit of priority of Chinese Patent Application No. 202110500590.4 filed on May 8, 2021. The contents of the above applications are all incorporated by reference as if fully set forth herein in their entirety.

FIELD OF DISCLOSURE

The present application relates to a display field and in particular, to a display panel and a manufacturing method thereof.

DESCRIPTION OF RELATED ART

In recent years, foldable display panels are more and more popular. Reliability of the display panel correlates with a service life of a bonding layer. After bonding of the bonding layer is completed, the bonding layer is flat. However, when the display panel is bent, tangential forces on a surface of the bonding layer point away from a center of a corresponding folding region, which causes the surface of the bonding layer to be excessively stretched, thus reducing a service life of the bonding layer in a bent state, and also reducing reliability of the display panel.

Therefore, there is an urgent need to provide a display panel and a manufacturing method thereof to solve the above technical problems.

SUMMARY

The present invention provides a display panel and a manufacturing method of the display panel, which can solve a problem in recent years that when the display panel is bent, tangential forces on a surface of a bonding layer point away from a center of a corresponding curved surface, causing the surface of the bonding layer to be excessively stretched. This reduces a service life of the bonding layer in a bent state.

In order to solve the above-mentioned problem, the present application provides technical solutions as follows.

The present application provides a display panel, comprising: a first folding region; and two non-folding regions located at two sides of the first folding region; wherein the first folding region is provided with a first film layer, a second film layer, and a bonding layer between the first film layer and the second film layer;

- wherein the bonding layer comprises a first surface in contact with the first film layer and a second surface in contact with the second film layer; and when the display panel is in a bent state, first tangential forces of the first film layer exerted on the first surface and second tangential forces of the second film layer exerted on the second surface point to a center of the first folding region.

In one embodiment, wherein when the display panel is in the bent state, the first surface is arranged close to a concave direction of the first folding region, and the second surface is arranged close to a convex direction of the first folding region; and

- when the display panel is in a flat state, the first tangential forces on the first surface point to the center of the first folding region, and the second tangential forces on the second surface are zero.

In one embodiment, when the display panel is in the bent state, an orthographic projection of the second surface projected on the first surface is located within the first surface; and when the display panel is in the flat state, an orthographic projection of the first surface projected on the second surface is located within the second surface.

In one embodiment, when the display panel is in the bent state or in the flat state, an orthographic projection of the first surface projected on the second surface is located within the second surface.

In one embodiment, when the display panel is in a rest state, a bending curvature of the display panel is greater than zero.

In one embodiment, the display panel comprises a second folding region arranged corresponding to the first folding region, and a plurality of film layers in the second folding region and the film layers in the first folding region are bent toward a same direction.

In one embodiment, the bonding layer comprises an adhesive film body, and a material of the adhesive film body is an optical adhesive.

The present application further provides a manufacturing method of a display panel, the display panel comprising a first folding region and two non-folding regions located at two sides of the first folding region, the manufacturing method of the display panel comprising following steps:

- providing a bonding layer, wherein the bonding layer comprises a bending section arranged corresponding to the first folding region and a first section and a second section arranged corresponding to the non-folding regions, and a bending curvature of the bending section is a first curvature;
- providing a first film layer, and attaching the first film layer to a first surface of the bonding layer to form a composite film layer; and
- setting the composite film layer in a flat state, and forming a second film layer on a second surface of the bonding layer away from the first film layer, wherein a curvature formed by the composite film layer and the second film layer is a second curvature, and the first curvature is greater than the second curvature;
- wherein when the display panel is in a bent state, first tangential forces of the first film layer exerted on the first surface and second tangential forces of the second film layer exerted on the second surface point to a center of the first folding region.

In one embodiment, the step of providing the bonding layer, in which the bonding layer comprises the bending section arranged corresponding to the first folding region and the first section and the second sections arranged corresponding to the non-folding regions, and the bending curvature of the bending section is the first curvature, comprises following steps:

- providing a bonding material layer, wherein the bonding material layer comprises a bending section arranged corresponding to the first folding region and a first section and a second section arranged corresponding to the non-folding regions;
- placing the bonding material layer on a first jig for bending the bonding material layer to make the bending curvature of the bending section be the first curvature; and separating the bonding material layer from the first jig to obtain the bonding layer.

In one embodiment, the bonding material layer comprises a first protective film, a second protective film, and an adhesive film body located between the first protective film and the second protective film, and the step of placing the bonding material layer on a first jig for bending the bonding material layer to make the bending curvature of the bending section be the first curvature comprises following steps:

placing the adhesive material layer on the first jig which is located on one side close to the first protective film;

removing the second protective film; and bending the first protective film and the adhesive film body on the first jig to make the bending curvature of the bending section be the first curvature.

In one embodiment, after the step of removing the second protective film, the manufacturing method further comprises:

forming a third protective film on one side of the adhesive film body away from the first protective film.

In one embodiment, the step of setting the composite film layer in the flat state and forming the second film layer on the second surface of the bonding layer away from the first film layer comprises:

removing the third protective film;

setting the composite film layer in the flat state; and forming the second film layer on the second surface of the bonding layer away from the first film layer.

In one embodiment, the step of placing the bonding material layer on the first jig for bending the bonding material layer comprises following steps:

placing the bonding material layer on the first jig; and heating the bonding material layer while bending the bonding material layer.

In one embodiment, a heating temperature ranges from 50° C. to 80° C.

In one embodiment, the step of heating the bonding material layer comprises:

heating the bonding material layer from a first temperature to a second temperature at a first temperature rising rate; and heating the bonding material layer from the second temperature to a third temperature at a second temperature rising rate.

In one embodiment, the first temperature rising rate is greater than the second temperature rising rate.

In one embodiment, the first jig comprises a first convex portion, the first convex portion is arranged corresponding to the first folding region, and the first folding region is arranged corresponding to the bending section.

In one embodiment, the display panel further comprises a second folding region arranged corresponding to the first folding region, and a plurality of film layers in the second folding region and the film layers in the first folding region are bent toward a same direction.

In one embodiment, the first jig comprises a first convex portion and a second convex portion; the first convex portion is arranged corresponding to the first folding region; and the second convex portion is arranged corresponding to the second folding region.

In one embodiment, the step of placing the bonding material layer on the first jig for bending the bonding material layer further comprises following steps:

applying an inert gas on the bonding material layer; and placing the bonding material layer on the first jig for a first time period.

Advantages of the Present Application

In the present invention, the bonding layer is bent in advance, and the bonding layer is bonded with the first film layer in the bent state and bonded with the second film layer in the flat state, so that the tangential forces on the surfaces of the bonding layer exerted by the adjacent film layers point to the center of the first folding region. Accordingly, when the display panel is bent, the surfaces of the bonding layer is prevented from being excessively stretched, which can effectively relieve a bending stress of the bonding layer, prolong a service life of the bonding layer, and improve reliability of the display panel.

BRIEF DESCRIPTION OF DRAWINGS

In order to explain the technical solutions of the present invention more clearly, drawings which will be described in the embodiments are briefly introduced hereinafter.

Obviously, the accompanying drawings described below are only some embodiments of the present invention. Persons of ordinary skills in the art are able to obtain other drawings based on these drawings.

DETAILED DESCRIPTION OF EMBODIMENTS

The present application provides a display panel and a manufacturing method of the display panel. In order to make the objectives, technical solutions, and functions of the present application clearer and more definite, the present application will be further described in detail below with reference to the accompanying drawings and specific embodiments. It should be understood that the embodiments described here are only used to describe the present application, and are not used to limit the present application.

The present application provides a display panel and a manufacturing method of the display panel. Detailed descriptions are provided below. It should be noted that an order of descriptions in the following embodiments is not intended to limit a preferable sequence of the embodiments.

Figure 1:
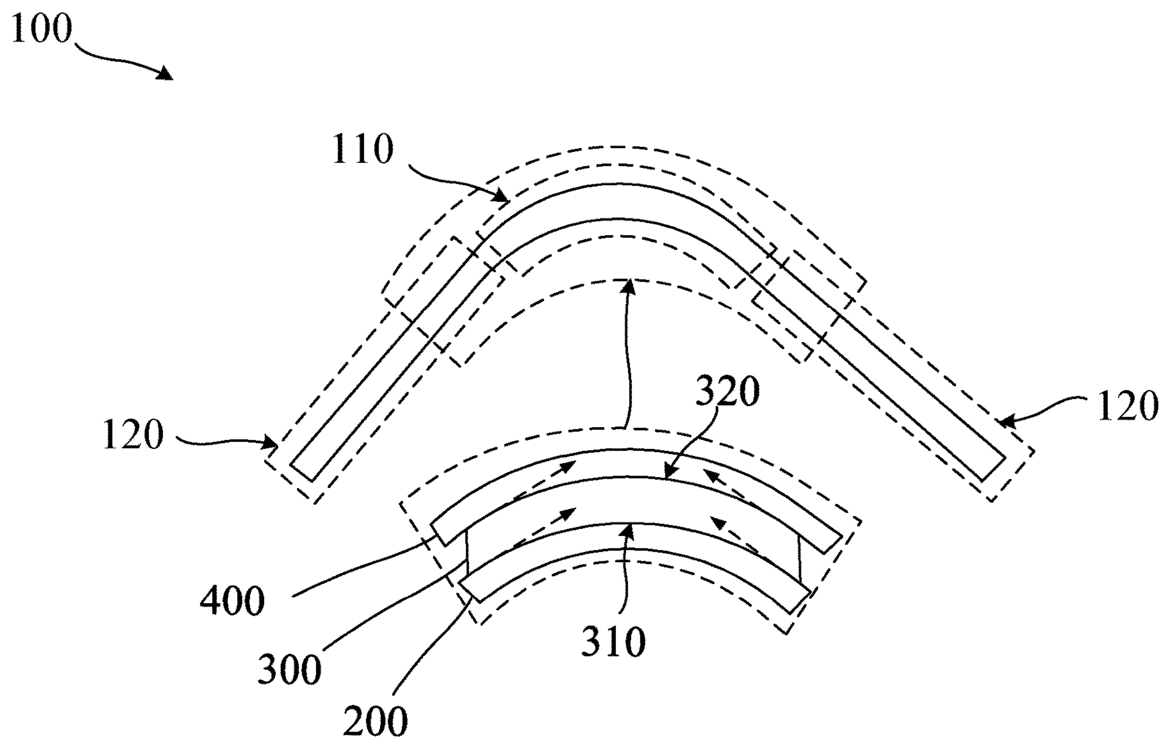
FIG. 1 is a schematic structural view illustrating a first state of a first structure of a display panel according to one embodiment of the present invention.

Referring to FIG. 1, the present invention provides a display panel 100. The display panel 100 comprises a first folding region 110 and two non-folding regions 120 located at two sides of the first folding region 110. The first folding region 110 is provided with a first film layer 200, a second film layer 400, and a bonding layer 300 located between the first film layer 200 and the second film layer 400.

The bonding layer 300 comprises a first surface 310 in contact with the first film layer 200 and a second surface 320 in contact with the second film layer 400. When the display panel 100 is in a bent state, first tangential forces of the first film layer 200 exerted on the first surface 310 and second tangential forces of the second film layer 400 exerted on the second surface 320 point to a center of the first folding region 110.

In the present invention, the bonding layer is bent in advance, and the bonding layer is bonded with the first film layer in the bent state and bonded with the second film layer in the flat state, so that the tangential forces of the adjacent film layers exerted on the surfaces of the bonding layer point to the center of the first folding region. Accordingly, when the display panel is bent, the surfaces of the bonding layer is prevented from being excessively stretched, which can effectively relieve bending stresses of the bonding layer, prolong a service life of the bonding layer, and improve reliability of the display panel.

The technical solution of the present invention will be described in conjunction with specific embodiments.

The display panel 100 comprises a first folding region 110 and two non-folding regions 120 located at two sides of the first folding region 110. The first folding region 110 is provided with a first film layer 200, a second film layer 400, and a bonding layer 300 between the first film layer 200 and the second film layer 400. The bonding layer 300 comprises a first surface 310 in contact with the first film layer 200 and a second surface 320 in contact with the second film layer 400. When the display panel 100 is in a bent state, first tangential forces of the first film layer 200 exerted on the first surface 310 and second tangential forces of the second film layer 400 exerted on the second surface 320 point to a center of the first folding region 110.

Please refer to FIG. 1 for details.

In the present embodiment, when the display panel 100 is in the bent state, the tangential forces on the surfaces of the bonding layer 300 point to the center of the first folding region 110. Please refer to FIG. 1 for details. This way, when the display panel 100 is bent, tensile forces on the surfaces of the bonding layer 300 are relieved, and the surfaces of the bonding layer 300 are subjected to compressive forces, which prevents the surfaces of the bonding layer 300 from being excessively stretched, thus effectively relieving bending stresses of the bonding layer 300, prolonging a service life of the bonding layer 300, and improving reliability of the display panel 100.

Figure 2:
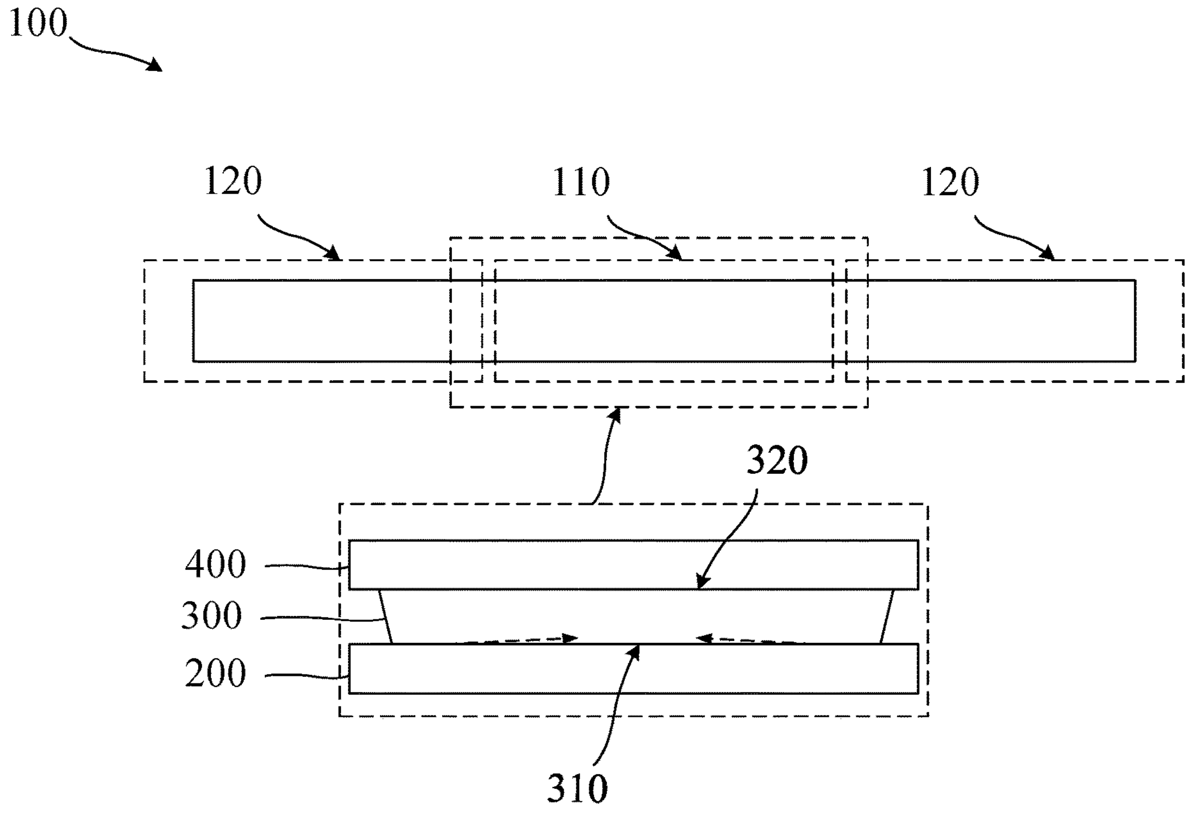
FIG. 2 is a schematic structural view illustrating a second state of the first structure of the display panel according to one embodiment of the present invention.

In the present embodiment, when the display panel 100 is in the bent state, the first surface 310 is close to a concave direction (a concave side) in the first folding region 110, and the second surface 320 is close to a convex direction (a convex side) in the first folding region 110, as shown in FIG. 1. When the display panel 100 is in a flat state, the first tangential forces on the first surface 310 point to the center of the first folding region 110, and the second tangential forces on the second surface 320 are zero, as shown in FIG. 2. During manufacturing of the display panel 100, the first film layer 200 is attached when the bonding layer 300 has a first curvature. When a curvature of the bonding layer 300 is the first curvature, an internal stress of the bonding layer 300 is zero, a bending curvature of the first film layer 200 is also the first curvature, the first film layer 200 is attached to the bonding layer 300 at the first curvature, and the tangential forces between the first film layer 200 and the bonding layer 300 are zero. When the second film layer 400 is attached to the bonding layer 300, the second film layer 400 is in the flat state, and the first film layer 200 and the bonding layer 300 are also in the flat state. At this point, the first tangential forces of the first film layer 200 exerted on the first surface 310 point to the center of the first folding region 110, and the second tangential forces of the second film layer 400 exerted on the second surface 320 are zero. When the display panel 100 is in the flat state, forces between the second film layer 400 and the bonding layer 300 are relieved. At the same time, because the tangential forces between the first film layer 200 and the bonding layer 300 are zero when they are attached to each other, the tangential forces between the first film layer 200 and the bonding layer 300 in a process of setting the display panel 100 to the flat state are not very great, which is beneficial to prolong the service life of the bonding layer 300.

In the present embodiment, when the display panel 100 is in the bent state, an orthographic projection of the second surface 320 projected on the first surface 310 is located within the first surface 310. When the display panel 100 is in the flat state, an orthographic projection of the first surface 310 projected on the second surface 320 is located within the second surface 320, as illustrated in FIGS. 1 and 2. For different surfaces in different states, the bonding layer 300 can have different stretching relationships on the premise of no film layer displacement, so as to relieve bending stresses during a bending process.

Figure 3:
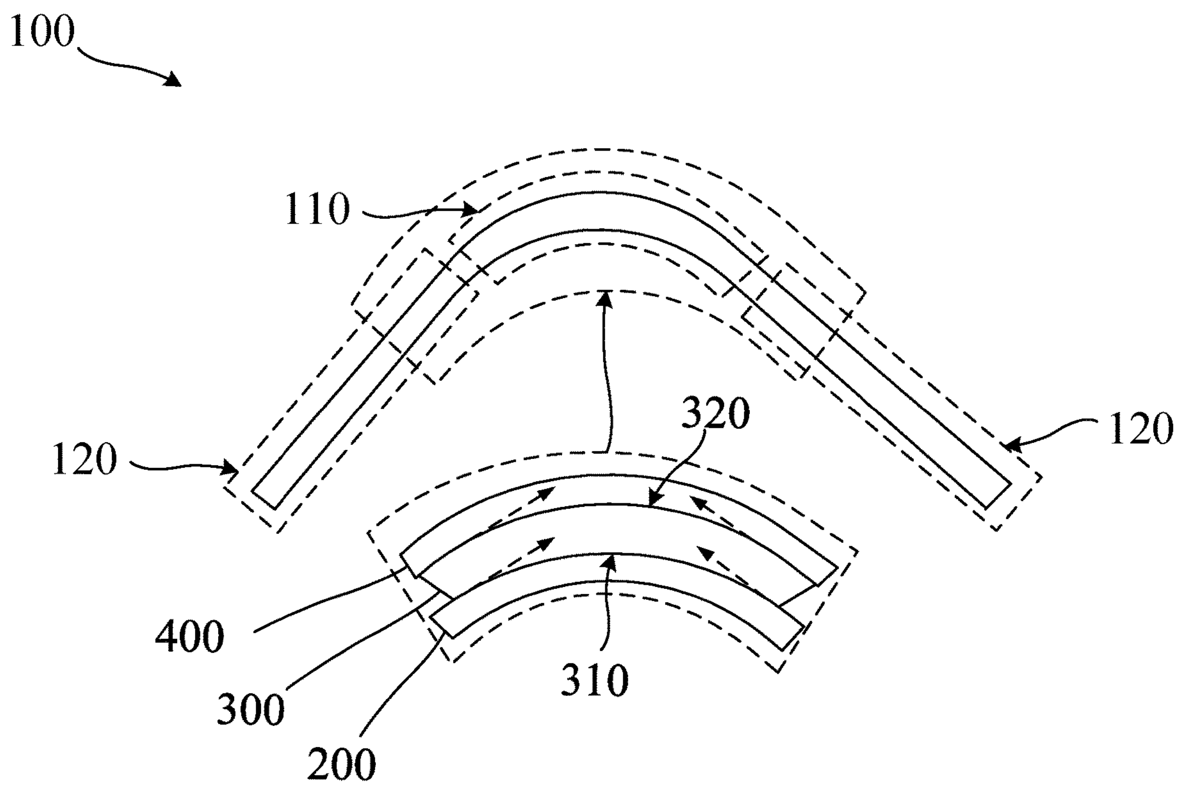
FIG. 3 is a schematic structural view illustrating a second structure of the display panel according to one embodiment of the present invention.

In the present embodiment, when the display panel 100 is in the bent state or the flat state, the orthographic projection of the first surface 310 on the second surface 320 is all located in the second surface 320, as illustrated in FIGS. 2 and 3. When the bonding layer 300 is a raw material, a surface area of the second surface 320 is larger than a surface area of the first surface 310. Whether during production or when the display panel 100 is bent, the second surface 320 is larger than the surface area of the first surface 310. The second surface 320 is close to the convex side in the first folding region 110, so the second surface 320 has a greater deformation pressure and a longer deformation stroke than a deformation pressure and a deformation stroke of the first surface 310. The slightly larger second surface 320 can reduce unit force per unit deformation, thereby relieving film layer displacement or bending stresses. The bonding layer 300 itself (different surfaces of the bonding layers) can have different stretching relationships, thereby alleviating the bending stresses during the bending process.

In the present embodiment, when the display panel 100 is in a rest state, the bending curvature of the display panel 100 is greater than zero. A bending curvature of the display panel 100 in the rest state is a second curvature. The bending curvature is the first curvature when the first film layer 200 is bonded to the bonding layer 300, and the first curvature is greater than the second curvature. In the case of the second curvature, an internal stress of the bonding layer 300 is zero, so when the display panel 100 is bent from flat to fully-bent, the internal stress (only its magnitude is discussed here) of the bonding layer 300 changes from presence to zero to presence again, and this internal stress changing process reduces an absolute value of the internal stress of the bonding layer 300.

Figure 4:
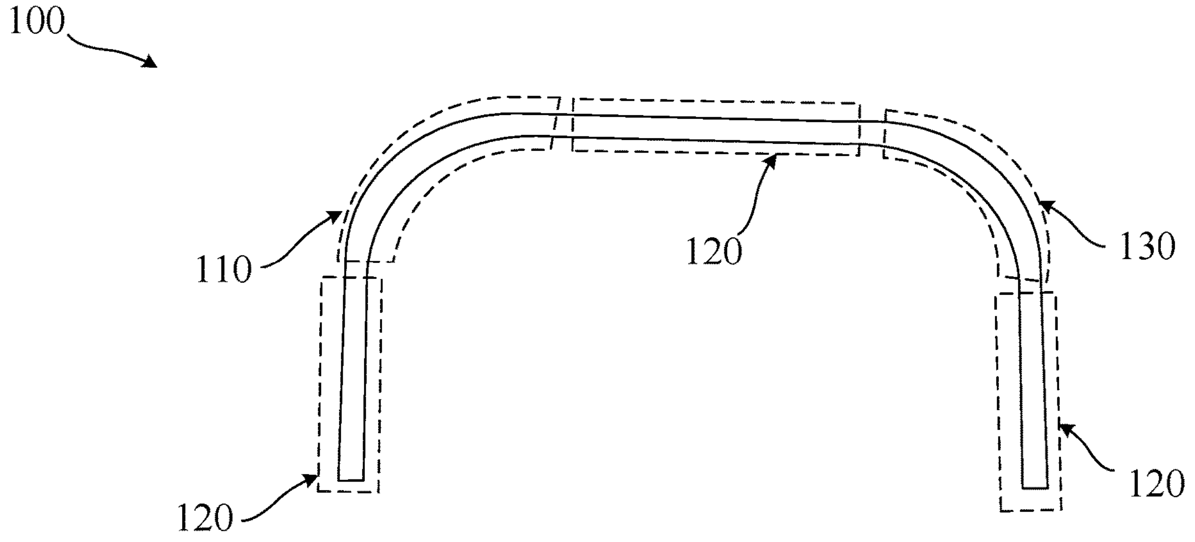
FIG. 4 is a schematic structural view illustrating a third structure of the display panel according to one embodiment of the present invention.

In the present embodiment, the display panel 100 further comprises a second folding region 130 corresponding to the first folding region 110, and film layers in the second folding region 130 and the film layers in the first folding region 110 are bent toward a same direction, as illustrated in FIG. 4. This configuration can be used in the display panel 100 having a same-side double-folding design. For the double-folding display panel 100, the first folding region 110 and the second folding region 130 can further relieve the internal stress of the bonding layer 300. The tangential forces of the bonding layer 300 act in the second folding region 130 in a way the same as a way in which the tangential forces of the bonding layer 300 act in the first folding region 110.

In the present embodiment, the display panel 100 can further comprise a plurality of third folding regions, and each third folding region can be in any area of the display panel 100. Therefore, according to different bending design requirements of the display panel 100, the internal stress of the bonding layer 300 is relieved, the service life of the bonding layer 300 is prolonged, and the reliability of the display panel 100 is improved.

Figure 6:
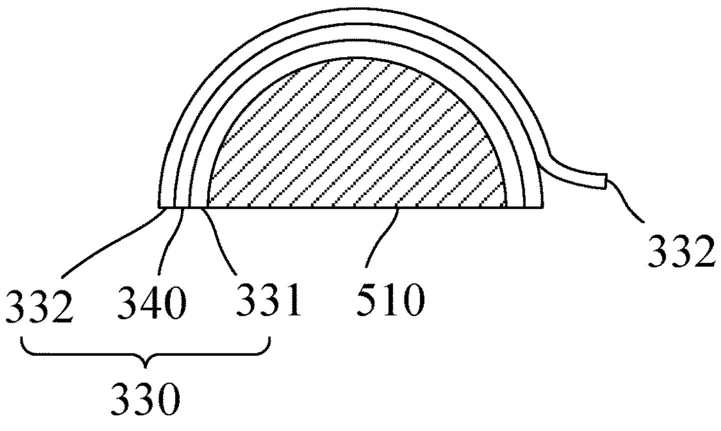
FIG. 6 is a first schematic view illustrating the manufacturing method of the display panel according to one embodiment of the present invention.

In the present embodiment, the bonding layer 300 comprises an adhesive film body 340, and a material of the adhesive film body 340 is an optical adhesive. Please refer to FIG. 6 for the manufacturing method of the display panel 100.

In the present embodiment, the first film layer 200 and the second film layer 400 are not limited to specific film layers of the display panel 100, and can be changed according to actual conditions of the display panel 100. For example, the first film layer 200 is a backplate layer, and the second film layer 400 is a steel plate layer.

In the present embodiment, the bonding layer is bent in advance, and the bonding layer is bonded with the first film layer in the bent state and bonded with the second film layer in the flat state, so that the tangential forces of the adjacent film layers exerted on the surfaces of the bonding layer point to the center of the first folding region. Accordingly, when the display panel is bent, the surfaces of the bonding layer is prevented from being excessively stretched, which can effectively relieve the bending stresses of the bonding layer, prolong the service life of the bonding layer, and improve the reliability of the display panel.

Figure 5:
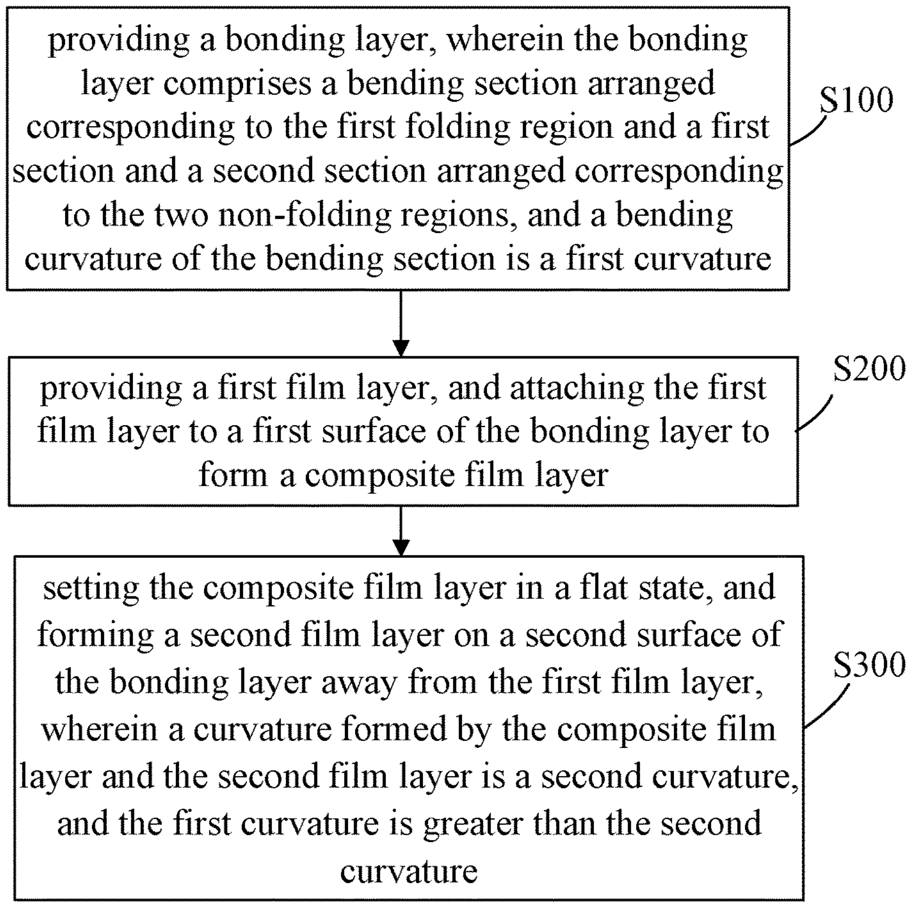
FIG. 5 is a process flow diagram illustrating a manufacturing method of the display panel according to one embodiment of the present invention.

Referring to FIG. 5, the present invention further provides a manufacturing method of a display panel 100. The display panel comprises a first folding region 110 and two non-folding regions 120 located at two sides of the first folding region 110. The manufacturing method of the display panel 100 comprises following steps:

S100: providing a bonding layer 300, wherein the bonding layer 300 comprises a bending section 350 arranged corresponding to the first folding region 110 and a first section 361 and a second section 362 arranged corresponding to the two non-folding regions 120, and a bending curvature of the bending section 350 is a first curvature;

S200: providing a first film layer 200, and attaching the first film layer 200 to a first surface 310 of the bonding layer 300 to form a composite film layer; and S300: setting the composite film layer in a flat state, and forming a second film layer 400 on a second surface 320 of the bonding layer 300 away from the first film layer 200, wherein a curvature formed by the composite film layer and the second film layer 400 is a second curvature, and the first curvature is greater than the second curvature;

wherein when the display panel 100 is in a bent state, first tangential forces of the first film layer 200 exerted on the first surface 310 and second tangential forces of the second film layer 400 exerted on the second surface 320 point to a center of the first folding region 110.

In the present invention, the bonding layer is bent in advance, and the bonding layer is bonded with the first film layer in the bent state and bonded with the second film layer in the flat state, so that the tangential forces of the adjacent film layers exerted on the surfaces of the bonding layer point to the center of the first folding region. Accordingly, when the display panel is bent, the surfaces of the bonding layer is prevented from being excessively stretched, which can effectively relieve bending stresses of the bonding layer, prolong a service life of the bonding layer, and improve reliability of the display panel.

The technical solution of the present invention is described in conjunction with specific embodiments.

The manufacturing method of the display panel 100 comprises:

S100: providing the bonding layer 300, wherein the bonding layer 300 comprises the bending section 350 corresponding to the first folding region 110 and the first section 361 and the second section 362 corresponding to the two non-folding regions 120, and the bending curvature of the bending section 350 is the first curvature. Please refer to FIG. 9 for details.

In the present embodiment, the display panel 100 comprises the first folding region 110 and the two non-folding regions 120 located at two sides of the first folding region 110. Please refer to FIG. 1 for details.

In the present embodiment, the display panel 100 further comprises a second folding region 130 corresponding to the first folding region 110. Film layers in the second folding region 130 and the film layers in the first folding region 110 are bent toward a same direction, as illustrated in FIG. 4. The present embodiment can be used in the display panel 100 with a same-side double-folding design. For the double-folding display panel 100, the first folding region 110 and the second folding region 130 can further relieve an internal stress of the bonding layer 300. Tangential forces of the bonding layer 300 act in the second folding region 130 in a way the same as a way in which tangential forces of the bonding layer 300 act in the first folding region 110.

Figure 9:
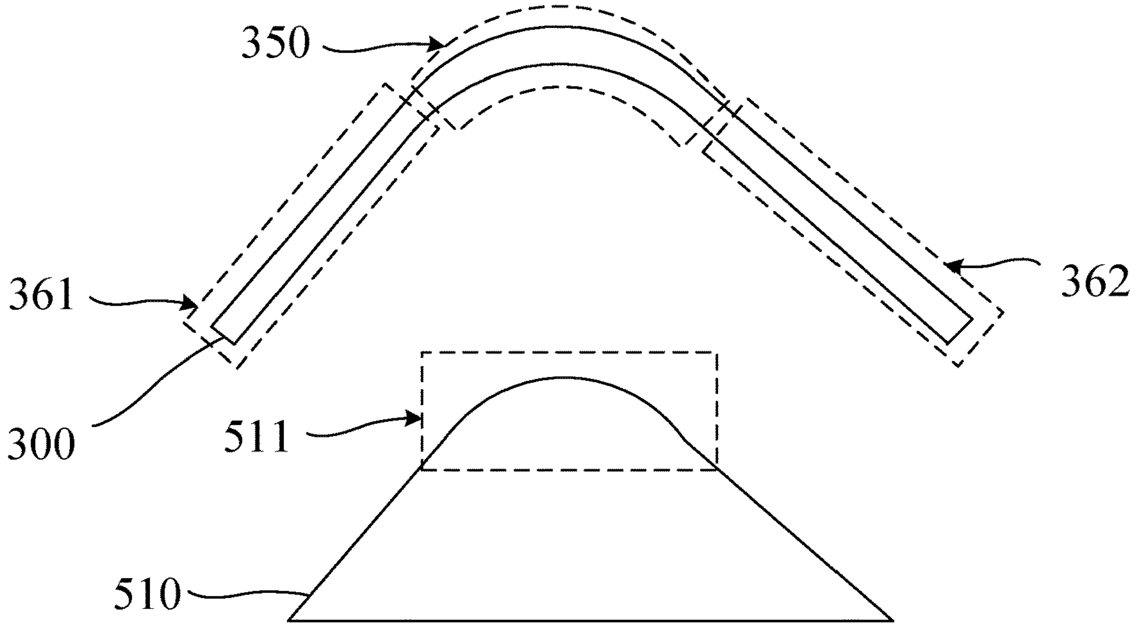
FIG. 9 is a fourth schematic view illustrating the manufacturing method of the display panel according to one embodiment of the present invention.

In the present embodiment, step S100 comprises:

S110: providing a bonding material layer 330. The bonding material layer 330 comprises the bending section 350 arranged corresponding to the first folding region 110 and the first section 361 and the second section 362 arranged corresponding to the non-folding regions 120, as illustrated in FIG. 9.

S120: placing the bonding material layer 330 on a first jig 510 for bending the bonding material layer 330 to make the bending curvature of the bending section 350 be the first curvature.

In the present embodiment, the adhesive material layer 330 comprises a first protective film 331, a second protective film 332, and an adhesive film body 340 located between the first protective film 331 and the second protective film 332. Please refer to FIG. 6 for details.

In the present embodiment, the first jig 510 comprises a first convex portion 511, the first convex portion 511 is arranged corresponding to the first folding region 110, and the first folding region 110 is arranged corresponding to the bending section 350. Please refer to FIG. 9 for details.

In the present embodiment, the first jig 510 comprises the first convex portion 511 and a second convex portion. The bonding layer 300 also comprises a second folding region 130 arranged corresponding to the first folding region 110. A plurality of film layers in the second folding region 130 and the film layers in the first folding region 110 are bent toward a same direction. The first convex portion 511 is arranged corresponding to the first folding region 110, and the second convex portion is arranged corresponding to the second folding region 130.

In the present embodiment, the step of placing the bonding material layer 330 on the first jig 510 for bending the bonding material layer 330 comprises following steps:

S120*a*: placing the bonding material layer 330 on the first jig 510; and

S120*b*: heating the bonding material layer 330 while bending the bonding material layer 330.

In the present embodiment, the step of heating the bonding material layer 330 can be bending while heating, or heating first and then bending, or bending first and then heating. The above step S120*b* is only an example of bending while heating.

In the present embodiment, the heating temperature can range from 50° C. to 80° C. Heating the bonding material layer 330 can accelerate removal of the internal stress of the adhesive film body 340 and accelerate formation of the bonding layer 300.

In the present embodiment, the step of heating the bonding material layer 330 comprises:

S120*c*: heating the bonding material layer 330 from a first temperature to a second temperature at a first temperature rising rate.

S120*d*: heating the bonding material layer 330 from the second temperature to a third temperature at a second temperature rising rate.

In the present embodiment, by rising the temperature, the present application increases a removal rate of the internal stress of the adhesive film body 340 and accelerate the formation of the bonding layer 300.

In the present embodiment, the first temperature rising rate is greater than the second temperature rising rate. Specifically, a heating approach to heat up fast first and then heat up slowly is adopted. The slow heating up process facilitates removal of the internal stress of the adhesive film body 340 without affecting a formation rate of a bonding material (the bonding layer 300).

In the present embodiment, the step of placing the bonding material layer 330 on the first jig 510 for bending the bonding material layer 330 further comprises:

S120*a*: applying an inert gas on the bonding material layer 330.

In the present embodiment, applying the inert gas on the bonding material layer 330 can enhance adhesion between the bonding material layer 330 and the first jig 510, which is beneficial to formation of the first folding region 110. A pressure of the inert gas can be greater than one atmosphere, and the specific pressure can be set according to different manufacturing requirements.

S1200: placing the bonding material layer 330 on the first jig 510 for a first time period, and the first time period is greater than 24 hours.

In the present embodiment, since the adhesive film body 340 is a viscoelastic material, the adhesive film body 340 still has the internal stress when the adhesive film body 340 is initially deformed on the first jig 510, but due to stress relaxation, the internal stress of the adhesive film body 340 will gradually disappear. Therefore, a resting step can further eliminate the internal stress to obtain a film material that is bent and has no internal stresses.

In the present embodiment, step S120 comprises:

S121: placing the adhesive material layer 330 on the first jig 510 which is located on one side close to the first protective film 331. Please refer to FIG. 6 for details.

Figure 7:
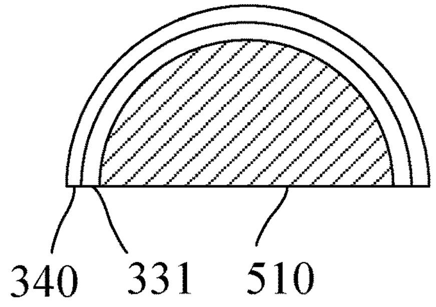
FIG. 7 is a second schematic view illustrating the manufacturing method of the display panel according to one embodiment of the present invention.

S122: removing the second protective film 332. Please refer to FIGS. 6 and 7 for details.

In the present embodiment, the removal of the second protective film 332 can allow the adhesive film body 340 to be bent sufficiently, so that the internal stress of the adhesive film body 340 in the bent state becomes zero, which facilitates use of the adhesive film body 340 in the display panel 100, effectively relieves the bending stresses of the bonding layer 300, prolongs the service life of the bonding layer 300, and improves the reliability of the display panel 100.

Figure 8:
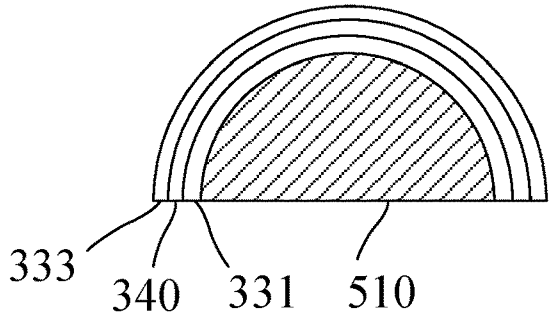
FIG. 8 is a third schematic view illustrating the manufacturing method of the display panel according to one embodiment of the present invention.

In the present embodiment, after step S122, it may further comprise:

S123: forming a third protective film 333 on one side of the adhesive film body 340 away from the first protective film 331. Please refer to FIG. 8 for details.

In the present embodiment, the third protective film 333 can protect the adhesive film body 340 to facilitate transfer of the bonding layer 300 and other operations. After removal of the stresses, the adhesive film body 340 can be covered with a film to obtain the bonding layer 300 bent and having no internal stresses.

In the present embodiment, the third protective film 333 is an entire layer. The third protective film 333 can protect the adhesive film body 340 and at the same time has a shaping effect.

In the present embodiment, step S123 can be omitted to proceed to step S124 directly.

S124: bending the first protective film 331 and the adhesive film body 340 on the first jig 510 to make the bending curvature of the bending section 350 be the first curvature.

S130: separating the bonding material layer 330 from the first jig 510 to obtain the bonding layer 300. Please refer to FIG. 9 for details.

In the present embodiment, after step S100, a bending curvature of the bonding layer 300 in a rest state is the first curvature. At this point, the internal stress of the bonding layer 300 is zero. That is to say, before the bonding layer 300 is attached to other film layers subsequently, the bonding layer 300 is already in a bent shape with a curvature.

S200: providing the first film layer 200, and attaching the first film layer 200 to the first surface 310 of the bonding layer 300 to form the composite film layer. Please refer to FIG. 10 for details.

In the present embodiment, step S200 comprises:

S210: placing the first film layer 200 on a second jig for bending the first film layer 200, and the second jig comprises a protrusion corresponding to the first curvature.

Figure 10:
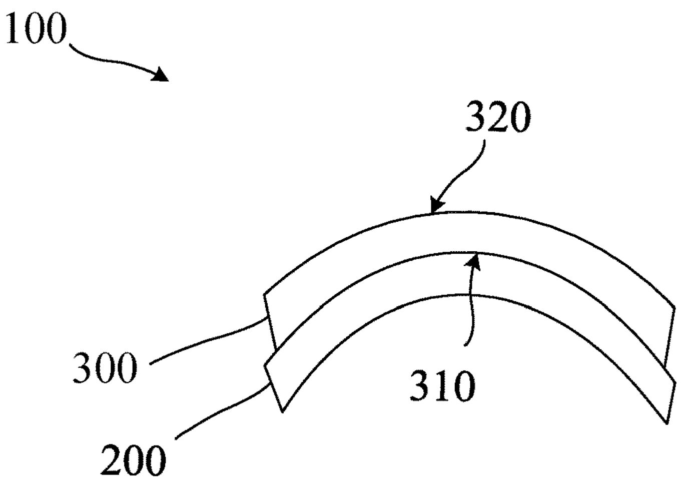
FIG. 10 is a fifth schematic view illustrating the manufacturing method of the display panel according to one embodiment of the present invention.

In the present embodiment, the first film layer 200 comprises a bent area corresponding to the first curvature. In details, the first film layer 200 comprises the bent area corresponding to the bent section 350 of the bonding layer 300, as shown in FIG. 10. When the first film layer 200 is attached to the bonding layer 300, the tangential forces on the two surfaces of the bonding layer 300 are zero, and the internal stress of the bonding layer is zero.

S220: attaching the first film layer 200 to the first surface 310 of the bonding layer 300 to form the composite film layer.

In the present embodiment, step S220 comprises:

S221: removing the first protective film 331 of the bonding layer 300, so that the adhesive film body 340 is exposed.

S222: attaching the first film layer 200 to the first surface 310 of the adhesive film body 340 to form the composite film layer.

In the present embodiment, a bending curvature of a bent region of the composite film layer formed is the first curvature, and the internal stress of the composite film layer is zero. The first tangential forces of the first film layer 200 exerted on the first surface 310 of the bonding layer 300 are zero, and the second tangential forces exerted on the second surface 320 of the bonding layer 300 corresponding to the first surface 310 are zero. Please refer to FIG. 10 for details.

Figure 11:
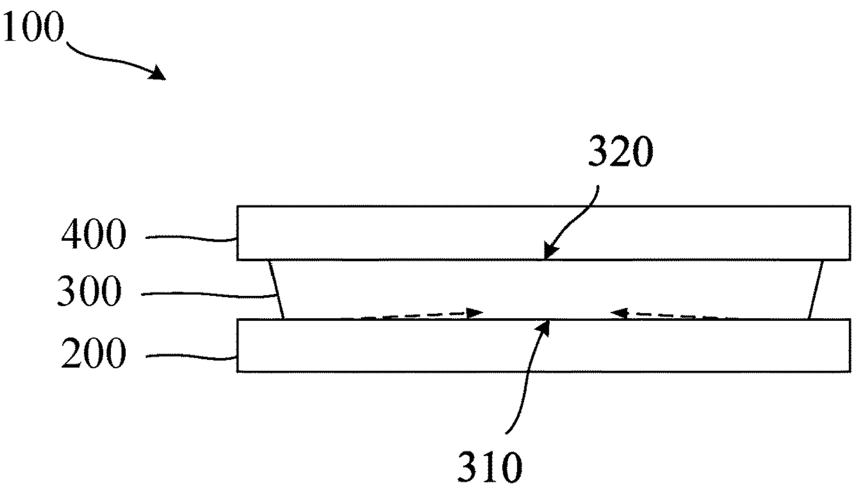
FIG. 11 is a sixth schematic view illustrating the manufacturing method of the display panel according to one embodiment of the present invention.

S300: setting the composite film layer in the flat state, and forming a second film layer 400 on the second surface 320 of the bonding layer 300 away from the first film layer 200, wherein a curvature formed by the composite film layer and the second film layer 400 is the second curvature, and the first curvature is greater than the second curvature. Please refer to FIG. 11 for details.

Figure 12:
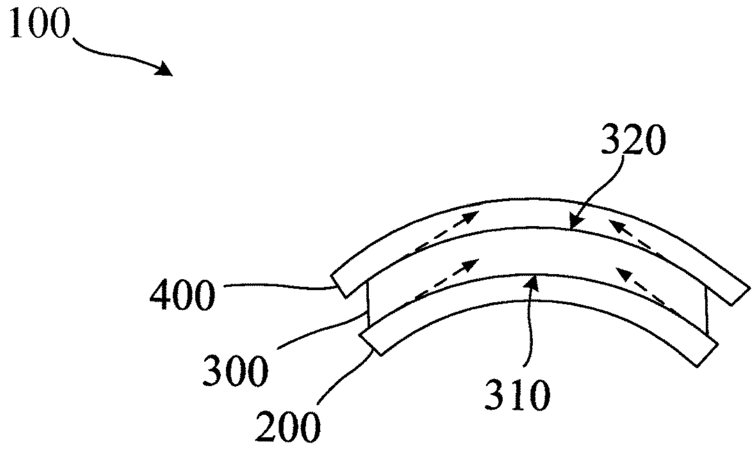
FIG. 12 is a seventh schematic view illustrating the manufacturing method of the display panel according to one embodiment of the present invention.

In the present embodiment, a curvature in FIG. 10 is the first curvature, and a curvature in FIG. 12 is the second curvature.

In the present embodiment, step S300 comprises:

S310: removing the third protective film 333.

In the present embodiment, when the bonding layer 300 comprises the third protective film 333, the third protective film 333 needs to be removed before the second film layer 400 is attached, so as to expose the adhesive film body 340 to improve the adhesion between the bonding layer 300 and the second film layer 400.

S320: setting the composite film layer in the flat state. Please refer to FIG. 11 for details.

In the present embodiment, the second film layer 400 is attached while the composite film layer is in the flat state, which can relieve interaction forces between the second film layer 400 and the bonding layer 300 during bending, thus prolonging the service life of the bonding layer 300.

S330: forming the second film layer 400 on the second surface 320 of the bonding layer 300 away from the first film layer 200. Please refer to FIG. 11 for details.

In the present embodiment, when the display panel 100 is in the rest state, a curvature of a member constituted by the composite film layer and the second film layer 400 is the second curvature. The first curvature is greater than the second curvature. Please refer to FIG. 12 for details.

In the present invention, the bonding layer is bent in advance, and the bonding layer is bonded with the first film layer in the bent state and bonded with the second film layer in the flat state, so that the tangential forces of the adjacent film layers exerted on the surfaces of the bonding layer point to the center of the first folding region. Accordingly, when the display panel is bent, the surfaces of the bonding layer are prevented from being excessively stretched, which can effectively relieve the bending stresses of the bonding layer, prolong the service life of the bonding layer, and improve the reliability of the display panel.

The present invention provides a display panel and a manufacturing method of the display panel. The display panel comprises a first folding region and two non-folding regions located at two sides of the first folding region. The first folding region is provided with a first film layer, a second film layer, and a bonding layer located between the first film layer and the second film layer. The bonding layer comprises a first surface in contact with the first film layer and a second surface in contact with the second film layer. When the display panel is in a bent state, first tangential forces of the first film layer exerted on the first surface and second tangential forces of the second film layer exerted on the second surface point to a center of the first folding region. In the present invention, the bonding layer is bent in advance, and the bonding layer is bonded with the first film layer in the bent state, and bonded with the second film layer in a flat state, so that the tangential forces of the adjacent film layers exerted on the surfaces of the bonding layer point to the center of the first folding region. Accordingly, when the display panel is bent, the surfaces of the bonding layer are prevented from being excessively stretched, which can effectively relieve bending stresses of the bonding layer, prolong a service life of the bonding layer, and improve reliability of the display panel.

It can be understood that for those of ordinary skill in the art, equivalent substitutions or changes can be made according to the technical solution and inventive concept of the present application, and all these changes or substitutions should be deemed to fall within the protection scope of the appended claims of the present application.

What is claimed is:

1. A display panel, comprising:

a first folding region; and two non-folding regions located at two sides of the first folding region;

wherein the first folding region is provided with a first film layer, a second film layer, and a bonding layer between the first film layer and the second film layer;

wherein the bonding layer comprises a first surface in contact with the first film layer and a second surface in contact with the second film layer; and when the display panel is in a bent state, first tangential forces of the first film layer exerted on the first surface and second tangential forces of the second film layer exerted on the second surface point to a center of the first folding region.

2. The display panel according to claim 1, wherein when the display panel is in the bent state, the first surface is arranged close to a concave direction of the first folding region, and the second surface is arranged close to a convex direction of the first folding region; and when the display panel is in a flat state, the first tangential forces on the first surface point to the center of the first folding region, and the second tangential forces on the second surface are zero.

3. The display panel according to claim 2, wherein when the display panel is in the bent state, an orthographic projection of the second surface projected on the first surface is located within the first surface; and when the display panel is in the flat state, an orthographic projection of the first surface projected on the second surface is located within the second surface.

4. The display panel according to claim 2, wherein when the display panel is in the bent state or in the flat state, an orthographic projection of the first surface projected on the second surface is located within the second surface.

5. The display panel according to claim 1, wherein when the display panel is in a rest state, a bending curvature of the display panel is greater than zero.

6. The display panel according to claim 1, further comprising a second folding region arranged corresponding to the first folding region, and a plurality of film layers in the second folding region and the film layers in the first folding region are bent toward a same direction.

7. The display panel according to claim 1, wherein the bonding layer comprises an adhesive film body, and a material of the adhesive film body is an optical adhesive.

8. A manufacturing method of a display panel, the display panel comprising a first folding region and two non-folding regions located at two sides of the first folding region, the manufacturing method of the display panel comprising following steps:

providing a bonding layer, wherein the bonding layer comprises a bending section arranged corresponding to the first folding region and a first section and a second section arranged corresponding to the non-folding regions, and a bending curvature of the bending section is a first curvature;

providing a first film layer, and attaching the first film layer to a first surface of the bonding layer to form a composite film layer; and setting the composite film layer in a flat state, and forming a second film layer on a second surface of the bonding layer away from the first film layer, wherein a curvature formed by the composite film layer and the second film layer is a second curvature, and the first curvature is greater than the second curvature;

wherein when the display panel is in a bent state, first tangential forces of the first film layer exerted on the first surface and second tangential forces of the second film layer exerted on the second surface point to a center of the first folding region.

9. The manufacturing method of the display panel according to claim 8, wherein the step of providing the bonding layer, in which the bonding layer comprises the bending section arranged corresponding to the first folding region and the first section and the second sections arranged corresponding to the non-folding regions, and the bending curvature of the bending section is the first curvature, comprises following steps:

providing a bonding material layer, wherein the bonding material layer comprises a bending section arranged corresponding to the first folding region and a first section and a second section arranged corresponding to the non-folding regions;

placing the bonding material layer on a first jig for bending the bonding material layer to make the bending curvature of the bending section be the first curvature; and separating the bonding material layer from the first jig to obtain the bonding layer.

10. The manufacturing method of the display panel according to claim 9, wherein the bonding material layer comprises a first protective film, a second protective film, and an adhesive film body located between the first protective film and the second protective film; and the step of placing the bonding material layer on a first jig for bending the bonding material layer to make the bending curvature of the bending section be the first curvature comprises following steps:

placing the adhesive material layer on the first jig which is located on one side close to the first protective film;

removing the second protective film; and bending the first protective film and the adhesive film body on the first jig to make the bending curvature of the bending section be the first curvature.

11. The manufacturing method of the display panel according to claim 10, wherein after the step of removing the second protective film, the manufacturing method further comprises:

forming a third protective film on one side of the adhesive film body away from the first protective film.

12. The manufacturing method of the display panel according to claim 11, wherein the step of setting the composite film layer in the flat state and forming the second film layer on the second surface of the bonding layer away from the first film layer comprises:

removing the third protective film;

setting the composite film layer in the flat state; and forming the second film layer on the second surface of the bonding layer away from the first film layer.

13. The manufacturing method of the display panel according to claim 9, wherein the step of placing the bonding material layer on the first jig for bending the bonding material layer comprises following steps:

placing the bonding material layer on the first jig; and heating the bonding material layer while bending the bonding material layer.

14. The manufacturing method of the display panel according to claim 13, wherein a heating temperature ranges from 50° C. to 80° C.

15. The manufacturing method of the display panel according to claim 14, wherein the step of heating the bonding material layer comprises following steps:

heating the bonding material layer from a first temperature to a second temperature at a first temperature rising rate; and heating the bonding material layer from the second temperature to a third temperature at a second temperature rising rate.

16. The manufacturing method of the display panel according to claim 15, wherein the first temperature rising rate is greater than the second temperature rising rate.

17. The manufacturing method of the display panel according to claim 13, wherein the first jig comprises a first convex portion, the first convex portion is arranged corresponding to the first folding region, and the first folding region is arranged corresponding to the bending section.

18. The manufacturing method of the display panel according to claim 13, wherein the display panel further comprises a second folding region arranged corresponding to the first folding region, and a plurality of film layers in the second folding region and the film layers in the first folding region are bent toward a same direction.

19. The manufacturing method of the display panel according to claim 18, wherein the first jig comprises a first convex portion and a second convex portion; the first convex portion is arranged corresponding to the first folding region; and the second convex portion is arranged corresponding to the second folding region.

20. The manufacturing method of the display panel according to claim 9, wherein the step of placing the bonding material layer on the first jig for bending the bonding material layer further comprises following steps:

applying an inert gas on the bonding material layer; and placing the bonding material layer on the first jig for a first time period.

* * * * *